(12) United States Patent
Appelt et al.

(10) Patent No.: US 6,343,812 B1
(45) Date of Patent: Feb. 5, 2002

(54) METHOD FOR FIXING AN ADJUSTABLE AUTOMOBILE STEERING COLUMN AND DEVICE FOR CARRYING OUT THE METHOD

(75) Inventors: Herbert Appelt, Diepholz; Kay-Uwe Grams, Cappeln; Herniu Michalski, Brinkum; Burkhard Schäfer, Ganderkesee; Rainer Schmidt, Diepholz, all of (DE)

(73) Assignee: Nacam Deutschland GmbH (DE)

( * ) Notice: Subject to any disclaimer, the term of this patent is extended or adjusted under 35 U.S.C. 154(b) by 0 days.

(21) Appl. No.: 09/582,930
(22) PCT Filed: Oct. 21, 1999
(86) PCT No.: PCT/DE99/03375
§ 371 Date: Aug. 7, 2000
§ 102(e) Date: Aug. 7, 2000
(87) PCT Pub. No.: WO00/27684
PCT Pub. Date: May 18, 2000

(30) Foreign Application Priority Data

Nov. 7, 1998 (DE) .......................................... 198 51 390

(51) Int. Cl.$^7$ ................................................. B62D 1/18
(52) U.S. Cl. ....................... 280/775; 280/735; 180/282; 74/493

(58) Field of Search ................................. 280/775, 777, 280/735, 731; 74/493; 180/271, 274, 282

(56) References Cited

U.S. PATENT DOCUMENTS

| | | | | |
|---|---|---|---|---|
| 5,295,712 A | * | 3/1994 | Omura | |
| 5,320,384 A | * | 6/1994 | Arnold et al. | |
| 5,503,431 A | * | 4/1996 | Yamamoto | |
| 5,722,299 A | * | 3/1998 | Yamamoto et al. | |
| 6,227,571 B1 | * | 5/2000 | Sheng et al. | |

* cited by examiner

Primary Examiner—Paul N. Dickson
(74) Attorney, Agent, or Firm—McGlew and Tuttle, P.C.

(57) ABSTRACT

A process is disclosed for fixing a motor vehicle steering column. The, motor vehicle steering column is adjustable in the axial and/or vertical direction and has a steering shaft and a housing accommodating the steering shaft, on a bracket of the steering column of the motor vehicle, which bracket is a rigid part of the body. In the case of an accident, a positive-locking connection is established by pyrotechnical device between the adjustable steering column housing and the bracket of the steering column, at the moment of the impact of the motor vehicle against an obstacle. A device for carrying about the above-mentioned process is disclosed, in which at least one pyrotechnical module and at least one element, which can be controlled by the pyrotechnical module, are present for the positive-locking connection between the steering column and the bracket, which is a rigid part of the body.

18 Claims, 1 Drawing Sheet

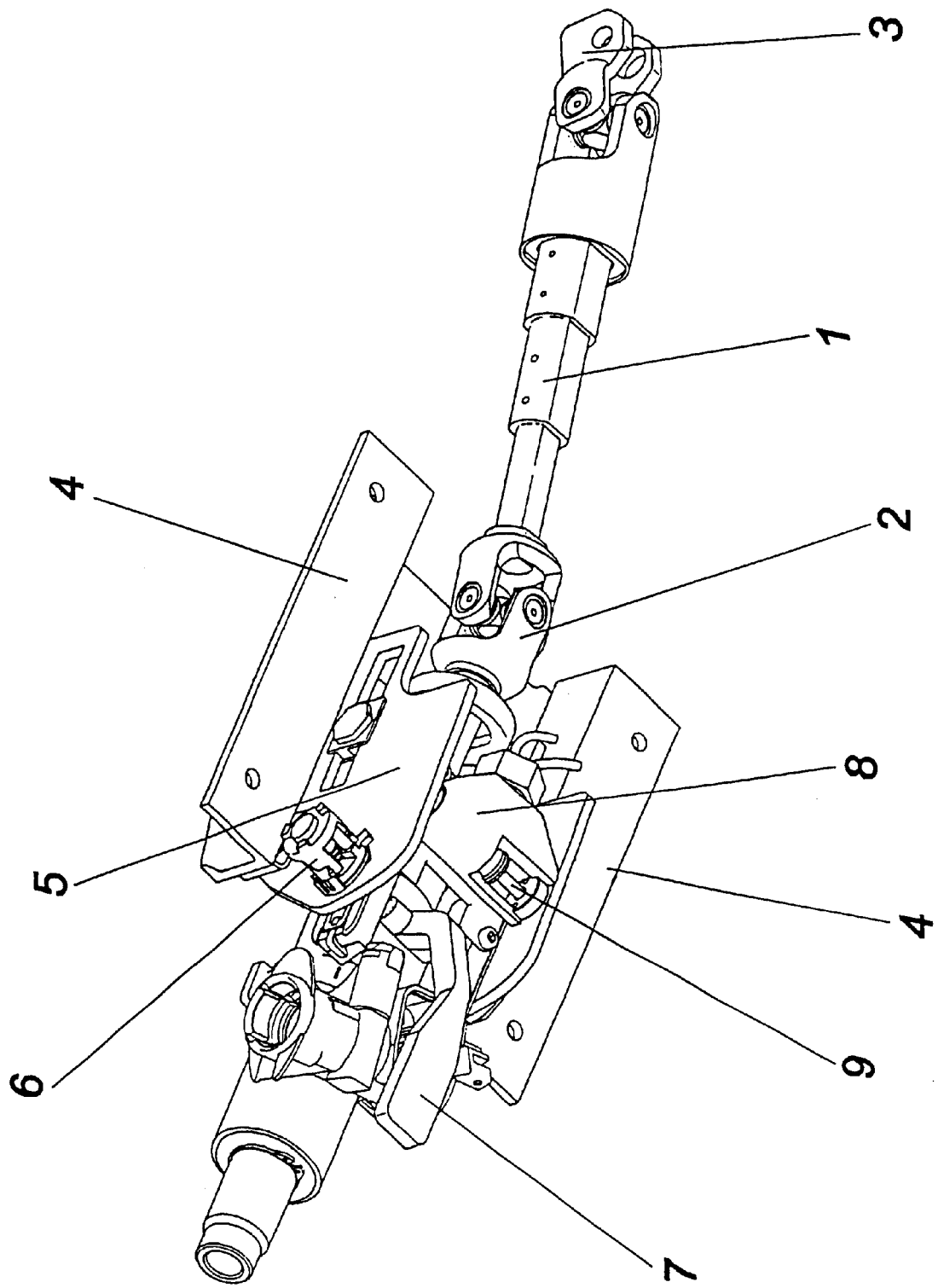

METHOD FOR FIXING AN ADJUSTABLE AUTOMOBILE STEERING COLUMN AND DEVICE FOR CARRYING OUT THE METHOD

FIELD OF THE INVENTION

The present invention pertains to a process for fixing a motor vehicle steering column, which is adjustable in the axial and/or vertical direction and has a steering shaft in an adjustable housing, on a bracket of the steering column of the motor vehicle, which bracket is a rigid part of the body, in the case of an accident, as well as to a device for carrying out the process.

BACKGROUND OF THE INVENTION

Such processes of this type for fixing adjustable motor vehicle steering columns are embodied in various manners in the state of the art. The need for fixing arises from the fact that a relative movement in the adjusting mechanism of the steering column at the moment of an accident must be extensively ruled out in the case of the now common use of air bags as passenger protection systems in order for the air bag as an impact protection means to be able to exert its full effectiveness for the driver.

The holding forces in the adjusting mechanism of the steering column are provided in the state of the art essentially by non-positive and positive-locking clamping mechanisms, and, within the framework of the integration of the functions, these clamping mechanisms must provide the strong holding forces in the case of an accident and they must also make it possible for the driver to fix the steering column after a positioning selected corresponding to the wishes of the driver in the axial and/or vertical position of the steering column.

Positive-locking clamping mechanisms are embodied, e.g., by means of toothed segments, wherein one toothed segment each is arranged on the body and on the adjustable steering column housing. To adjust the steering column, the tooth profiles, which normally engage one another by means of a locking device, are brought into spaced locations from one another by spring action and the toothed segments are again brought into engagement with one another by the locking device after the setting has been performed. Such positive-locking clamping mechanisms have the drawback that a continuous adjustability is not given between the steering column and the body, because a locking can take place by the engagement of the toothed segments in steps only corresponding the pitch of the teeth of the toothed segments. In addition, the problem that the driver has brought the steering column into a position in which the mutually opposite toothed segments stand against one another with their tips so that locking is ruled out altogether may arise in the case of the toothed segments used. Finally, a relatively large number of components are involved in this type of positive-locking clamping mechanisms and the reliable function of such clamping mechanisms requires a large amount of work during assembly and adjustment.

Moreover, non-positive clamping mechanisms have been known in the state of the art to guarantee a continuous adjustment of the steering wheel. These are embodied, e.g., by plates, wherein a fairly large number of plates are present on both the steering column housing and on the body-side bracket, which can be pushed into one another and are pressed together by suitable measures after the selection of the position of the steering column housing. To make it possible to provide sufficient holding forces in the case of an accident, these non-positive clamping mechanisms with plates require a relatively large space for mounting and have a heavy weight. In addition, there is a drawback, namely, that non-positive clamping mechanisms must provide extremely strong clamping forces, which inherently lead to a high stress on the components of the entire steering column fixing mechanism. The fact that non-positive clamping mechanisms usually require strong adjusting forces on the operating lever for the entire mechanism should be mentioned as another drawback of the steering column fixation of this type.

SUMMARY AND OBJECTS OF THE INVENTION

The object of the present invention is therefore to eliminate the drawbacks of existing positive-locking and non-positive clamping mechanisms for fixing the steering column housing on a bracket that is a rigid part of the body and, on the one hand, to guarantee sufficient fixation with easy operation of the entire device in the case of normal operation. On the other hand, it shall be ensured at the moment of an accident that a relative movement in the adjusting mechanism of the steering column is ruled out in order to guarantee the sufficient effect of the air bag.

This object is accomplished according to the present invention by the process of this type, in which at the moment of the impact of the motor vehicle against an obstacle, a positive-locking connection is established between the adjustable steering column housing and the bracket, which is a rigid part of the body, by pyrotechnical means. The fixation of the steering column housing in the case of normal operation and fixation in the case of an accident are functionally separated by this measure according to the present invention. The clamping mechanisms usually present are now used only to fix the steering column within the framework of the normal operation, and they must provide weak holding forces only. The extremely strong holding forces between the adjustable steering column housing and the bracket, which is a rigid part of the body, which holding forces are necessary in the case of an accident, are provided by a special, positive-locking connection, which can be designed and calculated especially for this extraordinary case of use.

The uncoupling and the separation of the functions of the locking systems for the normal case of operation and for the extraordinary occurrence of an accident makes it possible, for the first time ever, to optimize the two systems separately for their intended purposes.

The device according to the present invention for carrying out the above-mentioned novel process for fixing a motor vehicle steering column that is adjustable in the axial and/or vertical direction is characterized in that it has at least one pyrotechnical module and at least one element controllable by the pyrotechnical module for establishing the positive-locking connection between the adjustable steering column housing and the bracket of the steering column, which is a rigid part of the body. For example, a piston unit, preferably a piston-and-cylinder unit acting in both directions, may be used as the controllable element.

The pyrotechnical module and the element used for the positive-locking connection can be integrated as one assembly unit corresponding to a special design according to the present invention and be arranged between the steering column housing and the bracket of the steering column, which is a rigid part of the body. The cost of assembly for the installation of this modular assembly unit as well as the total space required for mounting can be reduced by this embodiment. Moreover, the number of components needed is reduced, because the special assembly unit according to the present invention can be optimized for its use within the framework of the functional integration.

According to another special embodiment of the device according to the present invention, the pyrotechnical module has a propellant charge, which is ignited by a control pulse of the motor vehicle's own onboard electronic system. The ignition of the pyrotechnical propellant charge can be coordinated with the activation of an air bag module installed in the motor vehicle, so that the control pulse for igniting the pyrotechnical propellant charge is sent simultaneously or slightly offset in time from the ignition of the air bag.

In another variant of the activation of the pyrotechnical module, separate activation is provided independently from the onboard electronic system of the motor vehicle.

An exemplary embodiment of the device according to the present invention for fixing a motor vehicle steering column adjustable in the axial and/or vertical direction with the process steps according to the present invention will be explained in greater detail below on the basis of the drawing attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The FIGURE is a perspective view of an overall assembly unit of a motor vehicle steering column with the device according to the present invention.

DESCRIPTION OF THE PREFERRED EMBODIMENT

Referring to the drawings in particular, the motor vehicle steering column shown has a steering shaft 1 with cardan joints 2 and 3 arranged thereon, which are accommodated in a steering column housing 5. The motor vehicle steering column, comprising the steering shaft 1 and the steering column housing 5 as well as complementary components, which are not explained in greater detail here, can be fixed on a bracket 4, which is a rigid part of the body. The fixation is performed under normal operating conditions by means of a clamping mechanism 6, which can be locked and released by means of a hand lever 7 to be actuated by the driver.

A pyrotechnical module 8 is arranged as a connection element between the steering column housing 5 and the bracket 4, which is a rigid part of the body. This pyrotechnical module 8 is designed to control an element 9 for the positive-locking connection between the adjustable steering column housing 5 and the bracket 4, which is a rigid part of the body. The pyrotechnical module 8 and the element 9 are designed as a common assembly unit, as a result of which an easy-to-mount, compact unit is obtained. A pyrotechnical propellant charge, which can be ignited by a control pulse of the motor vehicle's own onboard electronic system, is present within the said assembly unit. The control pulse for the pyrotechnical propellant charge may also be ignited independently from the motor vehicle's own onboard electronic system, depending on the design requirements imposed on the motor vehicle steering column.

While a specific embodiment of the invention has been shown and described in detail to illustrate the application of the principles of the invention, it will be understood that the invention may be embodied otherwise without departing from such principles.

What is claimed is:

1. A process for fixing a motor vehicle steering column, associated with a motor vehicle having a body, the process comprising:

providing the motor vehicle steering column to be adjustable in the axial and/or vertical direction and having a steering shaft in an adjustable steering column housing, on a bracket of the steering column of the motor vehicle, which said bracket is a rigid part of the body; and in the case of an accident, at the moment of the impact of the motor vehicle against an obstacle, establishing a positive-locking connection between the adjustable steering column housing and the bracket of the steering column, which said bracket is a rigid part of the body, by using a pyrotechnical device.

2. A process in accordance with claim 1, wherein said pyrotechnical device has a pyrotechnical propellant charge, which is ignited by a control pulse of a motor vehicle onboard electronic system.

3. A process in accordance with claim 1 wherein said pyrotechnical device has a pyrotechnical propellant charge, which is ignited by a control pulse provided independently from a motor vehicle onboard electronic system.

4. A process in accordance with claim 2, wherein the control pulse for igniting the pyrotechnical propellant charge is sent simultaneously with the activation of an air bag module installed in the motor vehicle.

5. A process in accordance with claim 3, wherein the control pulse for igniting the pyrotechnical propellant charge is sent simultaneously with the activation of an air bag module installed in the motor vehicle.

6. A process in accordance with claim 2, wherein the control pulse for igniting the pyrotechnical propellant charge is sent offset in time in relation to the activation of an air bag module installed in the motor vehicle.

7. A process in accordance with claim 3, wherein the control pulse for igniting the pyrotechnical propellant charge is sent offset in time in relation to the activation of an air bag module installed in the motor vehicle.

8. A motor vehicle steering column arrangement of a motor vehicle with a motor vehicle body, the motor vehicle steering column comprising:

a motor vehicle steering column adjustable in an axial and/or vertical direction and having a steering shaft in an adjustable steering column housing, on a bracket of the steering column of the motor vehicle, which said bracket is a rigid part of the body of the motor vehicle;

a pyrotechnical module; and a positive-locking connection element for establishing a positive-locking connection between said adjustable steering column housing and said bracket of said steering column, said element being actuated by said pyrotechnical module.

9. An arrangement in accordance with claim 8, wherein said positive-locking connection element for establishing the positive-locking connection and said pyrotechnical module are provided as an assembly unit and are arranged between said steering column housing and said bracket.

10. An arrangement in accordance with claim 8, wherein said pyrotechnical module has a pyrotechnical propellant charge, which is ignited by a control pulse from a motor vehicle on board electronic system.

11. An arrangement in accordance with claim 9, further comprising a motor vehicle onboard electronic system, wherein said pyrotechnical module has a pyrotechnical propellant charge, which is ignited by a control pulse of the motor vehicle onboard electronic system.

12. An arrangement in accordance with claim 8, further comprising a motor vehicle onboard electronic system, wherein said pyrotechnical module has a pyrotechnical propellant charge, which is ignited by a control pulse provided independently from the motor vehicle onboard electronic system.

13. An arrangement in accordance with claim 8, wherein a control pulse generated for igniting a pyrotechnical propellant charge is sent simultaneously with the activation of an air bag module installed in the motor vehicle.

14. An arrangement in accordance with claim 10, wherein the control pulse for igniting the pyrotechnical propellant charge is sent offset in time in relation to the activation of an air bag module installed in the motor vehicle.

15. A process for fixing a motor vehicle steering column associated with a motor vehicle having a body, the process comprising:

providing a bracket rigidly attached to the body;

providing an axially and/or laterally adjustable motor vehicle steering column and housing adjustable in an axial and/or vertical direction relative to said bracket;

providing a locking assembly including a pyrotechnical module containing a pyrotechnical propellant charge and a locking element for a locking connection between said housing and said bracket;

generating an actuation control pulse in response to a collision of the motor vehicle with an obstacle;

applying said control pulse to said pyrotechnical module for actuating said locking element of said locking assembly to positionally lock said motor vehicle adjustable steering column relative to said body.

16. A process in accordance with claim 15, wherein, the actuation control pulse is either generated by a vehicle on board electronic system or a pulse generator other than a vehicle on board electronic system.

17. A process in accordance with claim 15, further comprising:

actuating an airbag in response to a collision of the motor vehicle with an obstacle by applying one of the actuation control pulse or another control pulse; and inducing a time offset between said step of applying said control pulse to said pyrotechnical module and applying one of the actuation control pulse or another control pulse.

18. A process in accordance with claim 15, further comprising:

actuating an airbag in response to a collision of the motor vehicle with an obstacle by applying one of the actuation control pulse or another control pulse; and inducing step of applying said control pulse to said pyrotechnical module and applying one of the actuation control pulse or another control pulse to occur substantially simultaneously.

* * * * *